United States Patent Office 2,868,652
Patented Jan. 13, 1959

2,868,652

LIQUID SHORTENING AND METHOD OF MAKING SAME

Frank H. Brock, Decatur, Ill., assignor to A. E. Staley Manufacturing Company, Decatur, Ill., a corporation of Delaware No Drawing. Application September 17, 1954
Serial No. 456,867

13 Claims. (Cl. 99—118)

This invention relates, generally, to improvements and innovations in liquid oil shortenings and methods of producing the same. The liquid shortenings of the present invention have a creamy consistency at ordinary room temperatures by reason of their content, in the form of minute crystals, of small amounts of certain addition materials in an edible oil base, making the oil useful as a shortening when heated to a temperature at which the addition agents completely dissolve.

Considerable effort has been devoted to finding ways and means for satisfactorily using edible oils as liquid shortenings. While large quantities of vegetable oils are hydrogenated so as to form solid or plastic shortenings, e. g. hydrogenated cotton seed oil and hydrogenated soybean oil, such oils in their natural liquid state are not suitable as shortenings. The inducement for discovering practical ways and means of using edible oils as liquid shortenings, is the very large potential market which exists for satisfactory liquid shortenings. Such shortenings would be attractive to a customer not only because of their low cost, but also because of the conveniences and advantages in use which liquid shortenings would offer over the usual solid or plastic shortenings.

By way of prior art, there is a disclosure in Patent No. 2,532,523 to Trempel and Frink dated December 5, 1950 of an invention intended to make it possible to use all-oil or liquid shortenings in sweet goods and pastries, in place of the usual solid or plastic shortenings. In my copending application Serial No. 428,140 filed May 6, 1954, of which the present application is a continuation-in-part, improvements and innovations over the disclosure of Patent No. 2,532,523 are disclosed which make it possible to use all-oil or liquid shortenings in all types of sweet goods, and especially in those such as white cakes, wherein the ratio of sugar to flour is at least equal to or greater than one to one. The disclosure of my said copending application Serial No. 428,140 also comprehends the use of all-oil or liquid shortenings to manufacture cake mixes, from which the final products, i. e. cakes and pastries, may be conveniently prepared.

However, according to the disclosures of Trempel and Frink Patent No. 2,532,523 and also my copending application Serial No. 428,140, the various edible oils, e. g. soybean oil, peanut oil and corn oil, are not put in the form of stable liquid shortenings which may be packaged, stored and merchandised. Instead, the disclosures of said patent and said copending application teach and contemplate current or immediate preparation and use of the various liquid shortenings in heated condition as part of the process of preparing the cakes or cake mixes.

In accordance with the present invention, it has been discovered that it is entirely possible and practical to prepare liquid shortenings from edible oils in such a condition that the liquid shortenings may be conveniently packaged, handled, and merchandised in manners known to the grocery industry, and thereby do not have to be currently prepared and consumed as part of the cake-making or cake mix preparing operations.

Briefly stated, the present invention resides in forming a solution at elevated temperature of small or minor amounts of mono- and/or diglycerides and, preferably, smaller amounts of free fatty acid, in a triglyceride oil base, and then cooling the oil solution with agitation in such a way as to cause partial crystallization of the mono- and/or diglycerides (and also fatty acid if added) in minute crystals, thereby producing a liquid shortening of creamy consistency which has good stability against settling out of the crystals and separation of the oil under ordinary storage and handling conditions. In use, such liquid shortenings are first warmed sufficiently to redissolve the fine crystals and then introduced into the cake batters or prepared mixes.

An important object of the invention is the provision of liquid oil shortening which may be packaged, stored and merchandised in an ordinary manner and subsequently used in a liquid condition for the preparation of high quality cakes, cake mixes, and the like.

A further object of the invention is the provision of a suitable method of producing such liquid shortenings.

Certain other objects of the invention will, in part, be obvious and will, in part, appear hereinafter.

For a more complete understanding of the nature and scope of the invention, reference may now be had to the following detailed description thereof wherein illustrative examples are set forth.

Because of its abundance in excellent quality and at relatively low cost, edible soybean oil is particularly useful in accordance with this invention. Other glyceride oils may also be used as the base for the liquid shortenings including such oils as corn oil and peanut oil. However, these latter oils are considerably more expensive and are not as plentiful as soybean oil. It will be understood that these oils and other edible vegetable oils and various mixtures or blends thereof may be used as a base of liquid shortenings in accordance with this invention.

Either monoglycerides or diglycerides, or mixtures thereof, may be used as emulsifiers in and for the edible oils. The preferred emulsifiers are the glycerol mono- and distearates and the glycerol mono- and dipalmitates, or mixtures thereof. However, mono- and diglycerides of fatty acids containing at least 16 carbon atoms and not more than one double bond are useful as emulsifiers.

As mentioned above, it is preferred to also incorporate in the liquid oil shortenings made in accordance with this invention a relatively small amount of free fatty acid in addition to the mono- or diglyceride emulsifiers. Preferably, stearic acid is incorporated because of its commercial availability in edible grades at reasonable cost with freedom from objectionable odors and flavors. However, other free fatty acids, and mixtures thereof, may be used including, in general, fatty acids containing at least 16 carbon atoms and not more than one double bond. Soybean oil fatty acids, corn oil fatty acids and oleic acid have been used satisfactorily.

With respect to the constituents of the liquid shortenings (i. e. the liquid oils; the mono- and diglycerides, and the free fatty acids), commercial products of edible grade are satisfactory. Thus, edible grade vegetable oils serve the purpose very well. With respect to the mono- and/or diglycerides used as emulsifiers and the fatty acids used as addition agents, these can be of commercial edible grade. Commercial grade diglycerides and acids are usually not pure compounds but consist of mixtures of related glycerides or acids. For example, a commercial palmitate or palmitic acid will usually contain a considerable amount, for example, up to as much as 45%, of the corresponding stearate or stearic acid. Likewise, a commercial stearate or stearic acid will contain a considerable amount, up to as much as 45%, of palmitate or palmitic acid. The amount of fatty acid used is preferably in the range of 0.1% to 2.5% by weight of the liquid shortening.

Similarly, a commercial monoglyceride will usually contain an appreciable amount of diglyceride and a commercial diglyceride will contain an appreciable amount of the monoglyceride. The amount of monoglyceride emulsifier used is preferably about 4% to 9% by weight of the oil and the amount of diglyceride emulsifier used is preferably about 8% to 18% by weight of the liquid oil. Mixtures of di- and monoglycerides will be used in intermediate amounts.

Insofar as the present invention is concerned, there is ordinarily no particular advantage in using pure or even relatively pure glycerides or fatty acids since the normal constituents of commercial grade products are closely related and entirely satisfactory. Accordingly, the designations hereafter used will be understood to cover not only the individual fatty acids but also commercially available mixtures of edible grade.

The following examples will further illustrate and complete the disclosure of the present invention.

Example 1

93 lbs. of refined soybean oil, 5 lbs. of glycerol monostearate and 2 lbs. of edible stearic acid are heated together to a temperature of about 140° F. so that they are completely blended and melted together. The resulting solution is then chilled with stirring so that the added glycerol monostearate and stearic acid are partially crystallized in very small crystals to give a liquid product of creamy consistency. This combined chilling and agitating can be conveniently carried out in a piece of equipment known as a "Votator" of the type equipped and used for the cooling and crystallizing of ordinary and high ratio plastic hydrogenated vegetable shortening. A number of United States patents have been issued on this piece of equipment and various methods of using the same. Reference is made to Reissue Patent No. 22,519, reissued July 18, 1944, for a more detailed description of the construction and operation of such a device.

The resulting creamy liquid shortening has good shelf life. The emulsifier and fatty acid do not separate out nor does the oil separate, under ordinary storage and shelf-life conditions. When the liquid shortening is used to make cakes, cake mixes, or the like, it is weighed or measured out in the required amount and then warmed sufficiently to redissolve the crystals. Thereafter it is added to the cake batter or cake mix ingredients and the like as described, for example, in my copending application Serial No. 428,140.

Example 2

This example corresponds to Example 1 except that no free fatty acid is used and 95 lbs. of refined soybean oil are heated and processed with the 5 lbs. of glycerol monostearate. After passing through the "Votator" or other equivalent equipment, a liquid shortening of creamy consistency is obtained as in the case of Example 1. In use such liquid shortening is heated sufficiently to redissolve the crystals and then incorpoate it in the cake batters or cake mix ingredients and the like as described in my copending application Serial No. 428,140. However, cakes and the like prepared from liquid shortening from which the stearic acid has been omitted, while of acceptable quality, do not have as close grained texture as when the stearic acid is present.

As indicated above, the proportions of the ingredients in the liquid shortenings may vary within certain limits. The edible oil will constitute the base and major portion of the liquid shortening formulations and the emulsifier will constitute a minor portion. The free fatty acid will constitute a still smaller portion of the compositions. Generally, the free fatty acid will be used in the range of about 0.1% to 2.5% by weight.

In the foregoing examples it will, of course, be understood that the ingredients specifically mentioned may be replaced with other equivalent ingredients, either totally or in part. For example, in place or edible or refined soybean oil, peanut oil or corn oil may be substituted. In place of glycerol monostearate, glycerol distearate may be used but approximately twice as much will be required. In place of stearic acid, palmitic or oleic acids may be used or soybean oil fatty acids or corn oil fatty acids.

It will be understood that the foregoing examples are given as illustrative embodiments of the invention and that the scope of the invention is not intended to be limited to the particular formulations set forth therein. Certain changes and modifications of an obvious nature will be apparent to those skilled in the art without departing from the spirit and scope of the invention as defined in the appended claims.

What is claimed as new is:

1. Liquid shortening consisting essentially of edible triglyceride oil base containing substantially no normally solid triglycerides, a minor amount of at least one member of the group consisting of mono- and diglycerides of fatty acid containing at least 16 carbon atoms and not more than one double bond, and a small percent of free fatty acid containing at least 16 carbon atoms and not more than one double bond, said shortening having a creamy consistency at room temperature with minute crystals of said free fatty acid and of said glyceride suspended therein.

2. Liquid shortening consisting essentially of edible triglyceride oil base containing substantially no normally solid triglycerides, a minor amount of at least one member of the group consisting of glycerol monostearate and glycerol distearate, said monostearate being present alone in a concentration of about 4% to 9% by weight of the oil and said distearate being present alone in a concentration of about 8% to 18% by weight of the oil and mixtures thereof being present in intermediate concentrations and from about 0.1% to 2.5% by weight of the liquid shortening of free fatty acid containing at least 16 carbon atoms and not more than one double bond, said shortening having a creamy consistency at room temperature with minute crystals of said free fatty acid and of said stearate suspended therein.

3. The liquid shortening of claim 1 wherein said edible triglyceride oil base is soybean oil.

4. The liquid shortening of claim 2 wherein said edible triglyceride oil base is soybean oil.

5. The liquid shortening of claim 1 wherein said free fatty acid is stearic acid.

6. The liquid shortening of claim 2 wherein said free fatty acid is stearic acid.

7. Liquid shortening consisting essentially of soybean oil base containing substantially no normally solid triglycerides, a minor amount of at least one member of the group consisting of glycerol monostearate and glycerol distearate said monostearate being present alone in a concentration of about 4% to 9% by weight of the oil and said distearate being present alone in a concentration of about 8% to 18% by weight of the oil and mixtures thereof being present in intermediate concentrations, and from about 0.1% to 2.5% by weight of the liquid shortening of stearic acid, said shortening having a creamy consistency at room temperature with minute crystals of stearic acid and of said stearate suspended therein.

8. Liquid shortening comprising by weight approximately 93 parts of soybean oil, 5 parts of glycerol monostearate and 2 parts of stearic acid, said shortening having a creamy consistency at room temperature with minute crystals of stearic acid and glycerol monostearate suspended therein.

9. The method of making liquid shortening which comprises heating together at a temperature sufficiently high to form a solution thereof edible triglyceride oil base containing substantially no normally solid triglycerides and a minor amount of at least one member of the group consisting of mono- and diglycerides of fatty acid containing at least 16 carbon atoms and not more than one double bond, and cooling said solution with agitation to obtain a liquid shortening product of creamy consistency at room temperature with minute crystals of said glyceride suspended therein.

10. The method of making liquid shortening which comprises heating together at a temperature sufficiently high to form a solution thereof edible triglyceride oil base containing substantially no normally solid triglycerides, a minor amount of at least one member of the group consisting of mono- and diglycerides of fatty acid containing at least 16 carbon atoms and not more than one double bond, and a small percent of free fatty acid containing at least 16 carbon atoms and not more than one double bond, and cooling said solution with agitation to obtain a liquid shortening product of creamy consistency at room temperature with minute crystals of said free fatty acid and of said glyceride suspended therein.

11. The method of making liquid shortening which comprises heating together at a temperature sufficiently high to form a solution thereof soybean oil and a minor amount of at least one member of the group consisting of mono- and diglycerides of fatty acid containing at least 16 carbon atoms and not more than one double bond, and chilling said solution with agitation to obtain a liquid shortening product of creamy consistency at room temperature with minute crystals of said glyceride suspended therein.

12. The method of making liquid shortening which comprises heating together at a temperature sufficiently high to form a solution thereof soybean oil, a minor amount of at least one member of the group consisting of glycerol monostearate and glycerol distearate said monostearate being present alone in a concentration of about 4% to 9% by weight of the oil and said distearate being present alone in a concentration of about 8% to 18% by weight of the oil and mixtures thereof being present in intermediate concentrations, and from about 0.1% to 2.5% by weight of the liquid shortening of stearic acid, and chilling said solution with agitation to produce a liquid shortening of creamy consistency at room temperature with minute crystals of stearic acid and of said stearate suspended therein.

13. The method of making liquid shortening which comprises heating together at a temperature of about 140° F. about 93 parts by weight of soybean oil, about 5 parts by weight of glycerol monostearate and about 2 parts by weight of stearic acid, and chilling said solution with agitation to produce a liquid shortening of creamy consistency at room temperature with minute crystals of stearic acid and of said glycerol monostearate suspended therein.

References Cited in the file of this patent
UNITED STATES PATENTS

| | | |
|---|---|---|
| 1,342,827 | Schwarcman | June 8, 1920 |
| 1,917,254 | Harris | July 11, 1933 |
| 2,061,121 | Votaw et al. | Nov. 17, 1936 |
| 2,521,242 | Mitchell | Sept. 5, 1950 |
| 2,532,523 | Trempel et al. | Dec. 5, 1950 |

OTHER REFERENCES

Bailey, A. E.: "Industrial Oil and Products," Interscience Publishers Inc., New York (1945), pages 700–710.